United States Patent
Brahm et al.

(10) Patent No.: US 6,797,089 B2
(45) Date of Patent: Sep. 28, 2004

(54) ENERGY MANAGEMENT SYSTEM AND WELDING PROCESS THEREFOR

(75) Inventors: Joerg Brahm, Waterford, MI (US); Robert Gifford, Grand Blanc, MI (US)

(73) Assignee: Branson Ultrasonics Corporation, Danbury, CT (US)

(*) Notice: Subject to any disclaimer, the term of this patent is extended or adjusted under 35 U.S.C. 154(b) by 33 days.

(21) Appl. No.: 10/210,161

(22) Filed: Aug. 1, 2002

(65) Prior Publication Data

US 2003/0164218 A1 Sep. 4, 2003

Related U.S. Application Data

(60) Provisional application No. 60/358,123, filed on Feb. 20, 2002.

(51) Int. Cl.[7] ............................................. B29C 65/06
(52) U.S. Cl. .................. 156/73.5; 158/308.2; 280/752; 428/160
(58) Field of Search .................. 156/73.1, 73.5, 156/242, 244.11, 245, 308.2, 580; 180/90; 280/748, 752; 296/70, 74, 901; 428/156, 158, 159, 160, 71, 116, 304.4

(56) References Cited

U.S. PATENT DOCUMENTS

| | | | |
|---|---|---|---|
| 3,920,504 A | 11/1975 | Shoh et al. | |
| 5,026,445 A | 6/1991 | Mainolfi et al. | |
| 5,709,601 A | * 1/1998 | Heck | ........................ 454/121 |
| 5,979,965 A | * 11/1999 | Nishijima et al. | ............ 296/70 |
| 6,497,775 B2 | * 12/2002 | Visconti | .................... 156/73.1 |
| 6,706,365 B2 | * 3/2004 | Akasaka et al. | ............ 428/156 |

* cited by examiner

Primary Examiner—James Sells
(74) Attorney, Agent, or Firm—Harness, Dickey & Pierce P.L.C.

(57) ABSTRACT

An energy management system in accordance with an embodiment of the invention has a substrate and a crash pad that are vibration welded together. A method for vibration welding first and second parts made of materials that are incompatible with being vibration welded includes prior to vibration welding the first and second parts, adhering to a surface of at least the first part a layer of material that is compatible with being vibration welded to the second part.

32 Claims, 4 Drawing Sheets

ENERGY MANAGEMENT SYSTEM AND WELDING PROCESS THEREFOR

CROSS-REFERENCE TO RELATED APPLICATIONS

This application claims the benefit of U.S. Provisional Application No. 60/358,123 filed Feb. 20, 2002.

FIELD OF THE INVENTION

The present invention relates to energy management systems used in vehicles, such as headliners, and to a process used to manufacture them.

BACKGROUND OF THE INVENTION

Figure 1:
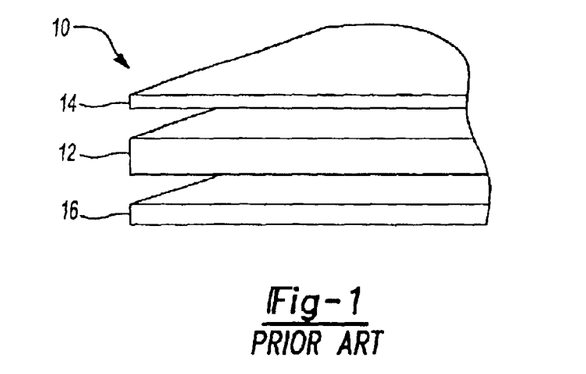
FIG. 1 is an exploded view of a prior art headliner.
Figure 2:
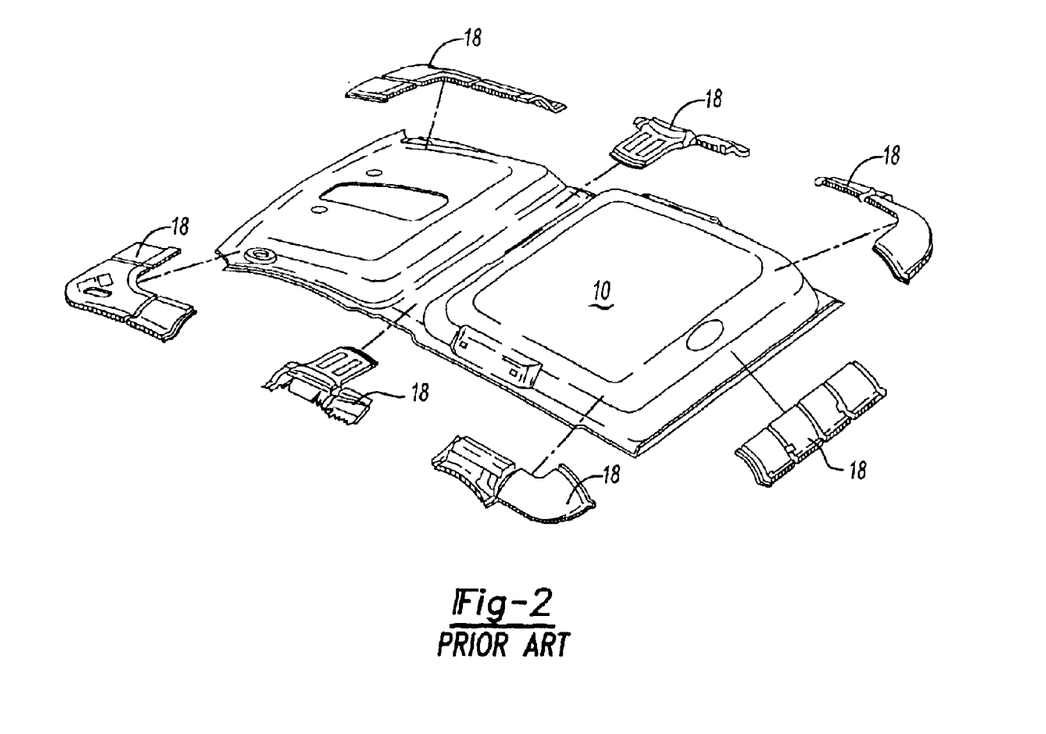
FIG. 2 is an exploded view of a prior art headliner energy management system.

In today's automotive vehicle's, energy management is an important consideration in protecting the occupants of a vehicle from injury in the event of a crash. As such, today's automotive vehicles typically include energy management systems in their interiors that manage the energy resulting from an occupant contacting them in a crash. As used herein, "energy management system" means a structure that has a substrate bonded to an energy absorbing pad or crash pad, such as a honeycomb structure. Such energy management systems are incorporated in headliners, A-pillars, B-pillars, C-pillars, instrument panels, side door trim panels, bumper, glove boxes and knee bolsters. For example, one type of headliner 10, an exploded view of which is shown in FIG. 1, is made of a layer 12 of polyurethane or polypropylene foam having a polyester or polypropylene backing sheet 14 and a front sheet 16 of fabric presenting a good appearance, such as felt, for the surface that is visible when the part is installed in a vehicle (referred to herein as the visible surface). In the context of automotive applications, the visible surface of a part is referred to as the "Class A" surface. Polyester/polypropylene backing sheet 14 and front sheet 16 are typically bonded to polyurethane/polypropylene foam layer 12 by adhesive. Crash pads, such as polypropylene honeycomb structures, polypropylene rib structures, or other crash pad structures, are then bonded to the headliner at the appropriate locations. FIG. 2 is an exploded view of such a headliner/crash pad energy management system in which crash pads 18 are bonded to headliner 10 by adhesive as discussed below. In the resulting headliner/crash pad energy management system, the headliner is the substrate and the crash pad is the polypropylene honeycomb structure, polypropylene rib structure, or other crash pad structure.

Heretofore, energy management systems have been manufactured by bonding the substrates to their crash pads with adhesive. With reference to headliners and FIG. 1, a typical manufacturing sequence is to load the headliner 10 onto a fixture in a press. Adhesive is then applied to headliner 10. After the adhesive is applied, crash pads 18 are placed onto the adhesive on headliner 10 and the press closed. After an appropriate hold or cure time, the press is opened and the completed headliner/crash pad energy management system is removed The foregoing process has a number of disadvantages. Adhesive guns are typically used to apply the adhesive to the substrate and they may leave excess adhesive or strings of adhesive on the backing and the visible surface of the substrate. An insufficient cure time and insufficient adhesive location may result in a weak bond between the substrate and the crash pad. Improper location of the crash pad on the substrate may result in interferences when the substrate/crash pad energy management system is installed in the vehicle. Further, the glue adds cost to the energy management system.

SUMMARY OF THE INVENTION

An energy management system in accordance with an embodiment of the invention has a substrate and a crash pad that are vibration welded together. In an embodiment, the substrate and crash pad are made at least in part of thermoplastic material. In an embodiment, the crash pad is a polypropylene honeycomb structure. In an embodiment, the crash pad is a polypropylene rib structure.

In an embodiment, the crash pad has a base layer of thermoset material, such as polyurethane, and a backing layer made at least in part of thermoplastic material, the crash pad and substrate being vibration welded so that the backing layer of the crash pad is vibration welded to the substrate. In an embodiment, the substrate has a backing layer made at least in part of thermoplastic material, the crash pad and substrate being vibration welded so that the backing layer of the substrate and the crash pad are vibration welded together. In an embodiment, the crash pad and the substrate can each have a backing layer made at least in part of thermoplastic material, the crash pad and substrate vibration welded so that their backing layers are vibration welded together.

In an embodiment, a headliner energy management system has a headliner having a base layer and a polyester or polypropylene backing layer, and a crash pad. The headliner and crash pad are vibration welded so that the polyester or polypropylene backing layer and crash pad are vibration welded together.

In an embodiment, a method for vibration welding first and second parts made of materials that are incompatible with being vibration welded includes prior to vibration welding the first and second parts, adhering to a surface of at least the first part a layer of material that is compatible with being vibration welded to the second part. In an embodiment, this layer of material is made at least in part of thermoplastic, such as polypropylene film. In a variant of the inventive method, respective layers of material that are compatible with being vibration welded to each other are adhered to surfaces of the first and second parts prior to the first and second parts being vibration welded. The first and second parts are vibration welded so that the respective layers of material on their surfaces are vibration welded together.

In an embodiment, a structure, such as an energy management system, is made by sandwiching a polypropylene honeycomb structure or polypropylene rib structure between polypropylene base plates. The polypropylene honeycomb structure or polypropylene rib structure is vibration welded to one of the polypropylene base plates and then vibration welded to the other polypropylene base plate.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 3:
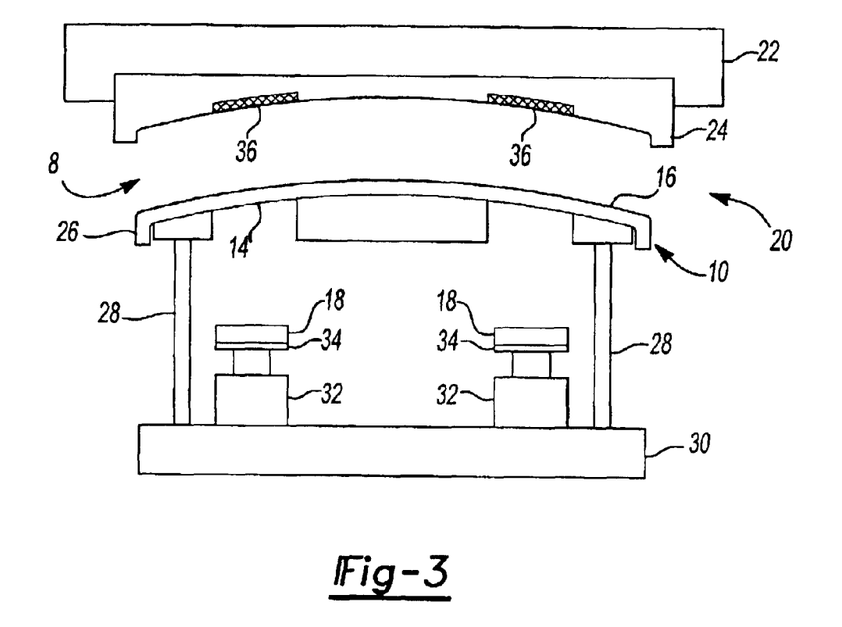
FIG. 3 is a side view of an energy management system in a vibration welding apparatus.
Figure 6:
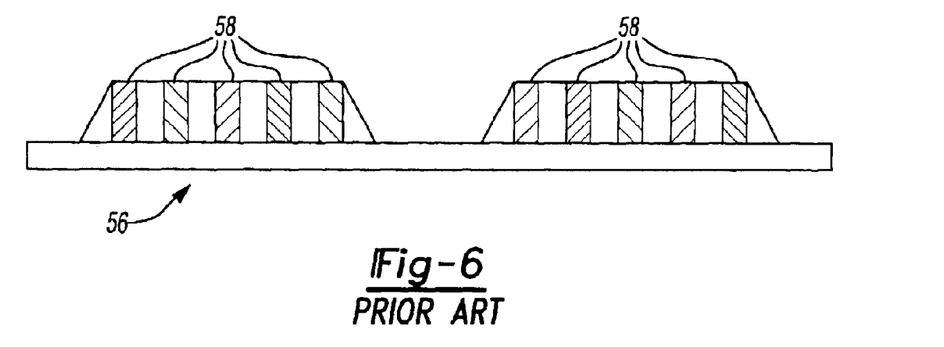
FIG. 6 is a side view of a polypropylene rib structure.

Referring to FIG. 3, the inventive process is described with reference to a headliner/crash pad energy management system 8 that comprises headliner 10 (FIG. 1) that is bonded to crash pad 18. Crash pad 18 is illustratively a polypropylene honeycomb structure. It should be understood that crash pad 18 can be other crash pad structures, such as polypropylene rib structure 56 (FIG. 6). As is known, polypropylene rib structure 56 is a structure molded from polypropylene to have ribs 58 for absorbing impact.

In FIG. 3, a friction or vibration welding apparatus 20 has a vibration head 22 having an upper tool 24 mounted thereto. Vibration welding apparatus 20 further has a lower pre-centering fixture 26 supported by cylinders 28 mounted on table 30. Vibration welding apparatus 20 also includes pressure zones 32 having crash pad receiving fixtures 34. Pressure zones 32 can illustratively be VS-8101/1, VS-8101/2 or VS-8101/7 pressure zones available from Branson Ultrasonics of Rochester Hills, Mich. Roughened inserts 36, such a knurled aluminum inserts, are mounted in upper tool 24.

Vibration welding apparatus 20 may illustratively be a vibration welding apparatus of the type disclosed in U.S. Pat. No. 3,920,504 for a Friction Welding Apparatus, the entirety of which is incorporated by reference herein.

Headliner 10 is loaded onto pre-centering fixture 26 with the visible (fabric layer 16) of the headliner face up. Crash pads 18 are placed on crash pad fixtures 34 and the welding cycle of vibration welding apparatus 20 initiated. Table 30 raises cylinders 28 and pressure zones 32, brining headliner 10 into upper tool 24 with pressure zones 32 forcing crash pads 18 against polyester backing layer 14 of headliner 10. When headliner 10 has been raised into upper tool, pre-centering fixture 26 is lowered. Vibration head 22 is then actuated vibrating the crash pad 18 against polyester backing sheet 14 of headliner 10 to vibration weld crash pads 18 to headliner 10. Roughened inserts 36 are positioned in upper tool 24 so that they are opposite crash pads 18 when headliner 10 has been raised into upper tool 24 and crash pads 18 are forced against headliner 10 by pressure zones 32. Upon completion of the vibration weld cycle, vibration welding apparatus 20 maintains crash pads 18 against headliner 10 under pressure for an appropriate hold time. Upon expiration of the hold time, table 30 is lowered and the completed headliner/crash pad energy management system 8 is removed from vibration welding apparatus 20.

It should be understood that vibration welding apparatus 20 can be configured so that crash pads 18 are raised into upper tool 24 and headliner 10 raised up against crash pads 18.

The vibration of one part against the other, in this case, the polypropylene honeycomb structure which is illustratively crash pad 18, against the polyester backing sheet 14 of headliner 10 causes sufficient frictional heat to melt the polypropylene thermoplastic of crash pad 18 and the thermoplastic of the polyester backing layer 14 of headliner 10 together creating one or both of a polymer joint and mechanical joint (interlocking) depending on the respective compositions of crash pad 18 and polyester backing layer 14. With polypropylene backing, the bond is essentially a polymer bond and with polyester backing, the bond is essentially a mechanical bond where the thermoplastic of the polypropylene honeycomb crash pads 18 around the fibers of the polyester backing layer 14 (interlocking). It should be understood that crash pads 18 can be other than polypropylene honeycomb structures, such as foam or polypropylene rib structures.

The above described process can be conducted using known friction or vibration welding apparatus, such as that described in the aforementioned U.S. Pat. No. 3,920,504. The welding parameter conditions are modified according to the materials of which the two parts to be welded are made to achieve appropriate vibration or friction welding of the two parts. The welding parameters of significance include pressure, amplitude, frequency, weld time and hold time.

The polypropylene honeycomb structure that is illustratively crash pad 18 can illustratively be any of the polypropylene honeycombs sold under the trade name TRAUMA-LITE Honeycombs by Trauma Lite Ltd., of Manchester, United Kingdom, the PP 8–80 TUBUS Honeycombs—Polypropylene sold by ATS, Inc. of Canonsburg, Pa., and the WAVECORE® polypropylene honeycombs sold by ATS, Inc. Illustrative welding parameters for welding polyester backed headliner material to such polypropylene honeycomb structures using a Branson Ultrasonics Mini-Vibration Welder available from Branson Ultrasonics are:

| | |
|---|---|
| Maximum Clamp Load: | 331 N–340N |
| Weld Amplitude | 1.70–180 mm (peak-to-peak) |
| Weld Time | 1–8 sec. |
| Weld Frequency | 240 Hz. |

Table 1 shows welding parameters for a Branson Ultrasonics MINI-VIBRATION WELDER used to weld pieces of such headliner material to such honeycomb structures in which a bond was achieved. The weld parameters for achieving satisfactory and optimal bonds can be determined by routine trials. (Honeycomb material with 10 mm and 20 mm thickness (70 mm×700 mm), headliner material with and without foam inside and polyester backing.)

TABLE 1

| Part # | Frequency [Hz] | Amplitude [mm] | Weld Force [N] | Melt Time [sec] | Hold Force [sec] | Hold Time [sec] | Comments |
|---|---|---|---|---|---|---|---|
| 1 | 240 | 1.80 | 340 | 5 | 340 | 5 | 10 mm/without foam backing |
| 2 | 240 | 1.80 | 340 | 8 | 340 | 5 | 10 mm/without foam backing |
| 3 | 240 | 1.80 | 340 | 8 | 340 | 5 | 10 mm/without foam backing |
| 4 | 240 | 1.80 | 340 | 8 | 340 | 5 | 20 mm/with foam backing |
| 5 | 240 | 1.80 | 340 | 8 | 340 | 8 | 20 mm/with foam backing |
| 6 | 240 | 1.80 | 340 | 5 | 340 | 5 | 10 mm/with foam backing |

Figure 7:
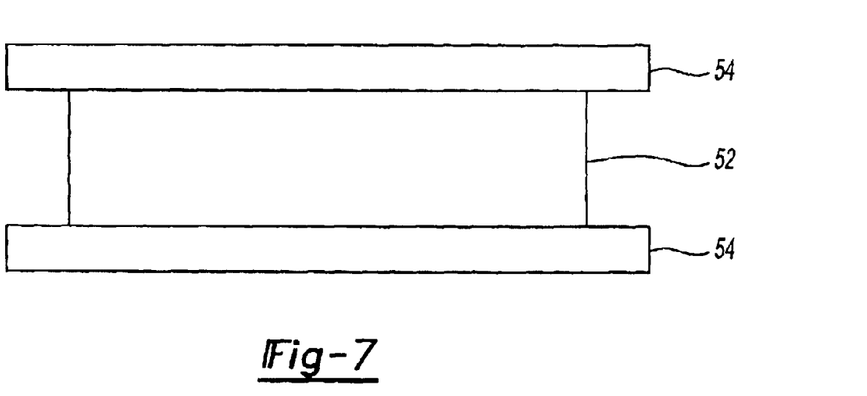
FIG. 7 is a side view of a structure formed in accordance with the invention.

Table 2 shows welding parameters for a Branson Ultrasonics MINI-VIBRATION WELDER used to weld sandwhich structures of polypropylene honeycomb structures of the above described types between two polypropylene plate substrates. In this regard, one side of honeycomb structure 52 (FIG. 7) is vibration welded to one of the polypropylene plates 54 and the other polypropylene plate 54 then vibration welded to the other side of the honeycomb structure (sandwich). The honeycomb structures were 10 and 20 mm thick and the polypropylene plates were 20% MFR (mineral filled) and 30% talc filled. (Honeycomb material with 10 mm and 20 mm thickness (70 mm×700 mm))

TABLE 2

| Part # | Frequency [Hz] | Amplitude [mm] | Weld Force [N] | Melt Time [sec] | Hold Force [N] | Hold Time [sec] | Comments |
|---|---|---|---|---|---|---|---|
| 1 | 240 | 1.80 | 340 | 8 | 340 | 8 | 10 mm/20% MFR filled, sandwhich |
| 2 | 240 | 1.80 | 340 | 8 | 340 | 8 | 20 mm/20% MFR filled, sandwhich |
| 3 | 240 | 1.80 | 340 | 5 | 340 | 5 | 10 mm/20% MFR filled |
| 4 | 240 | 1.80 | 340 | 5 | 340 | 5 | 10 mm/20% MFR filled |
| 5 | 240 | 1.80 | 340 | 8 | 340 | 5 | 20 mm/20% MFR filled |
| 6 | 240 | 1.80 | 340 | 8 | 340 | 8 | 20 mm/20% MFR filled |
| 7 | 240 | 1.80 | 340 | 8 | 340 | 8 | 20 mm/30% TF filled |
| 8 | 240 | 1.80 | 340 | 8 | 340 | 5 | 20 mm/30% TF filled |
| 9 | 240 | 1.80 | 340 | 5 | 340 | 5 | 10 mm/30% TF filled |
| 10 | 240 | 1.80 | 340 | 5 | 340 | 5 | 10 mm/30% TF filled |

In an embodiment of the invention, parts made of "incompatible" materials can be vibration or friction welded by adhering, such as by adhesive, a layer or of "compatible" material to one or both of the parts. As used herein, "compatible" material is material that can be vibration welded to the other part or to the other layer of compatible material, as the case may be. For example, polyurethane foam is a material that has been used to provide the crash pad in energy management structures. However, polyurethane foam is a thermoset material and cannot be effectively vibration or friction welded. To vibration or friction weld a thermoset material such as polyurethane to a thermoplastic material, such as polypropylene, a layer of compatible thermoplastic material, such as a polypropylene sheet, is adhered to the surface of the part made of the thermoset material that is to be welded to the part made of thermoplastic material. The part made of the thermoset material can then be vibration or friction welded to the part made of thermoplastic material by vibration welding the two parts so that the layer of thermoplastic material adhered to the part made of thermoset material is vibration welded to the other part. Two parts made of thermoset material can be similarly welded by vibration or friction welding by first adhering to the surfaces of each part that are to be welded to each other respective layers of compatible thermoplastic material. For example, sheets of polypropylene fleece can be adhered to the surfaces of the respective parts that are to be welded, such as by adhesive. Similarly, parts made of "incompatible" thermoplastics can be vibration welded by adhering to the surface of one or both parts that are to be welded together a layer (or layers as the case may be) of compatible thermoplastic. Incompatible thermoplastics are thermoplastics that have melt temperatures and flow indices that are sufficiently different so as to preclude effective vibration or friction welding of the two materials. Compatible thermoplastics are thermoplastics that have sufficiently similar melt temperatures and flow indices so that two materials can be friction or vibration welded.

Figure 4:
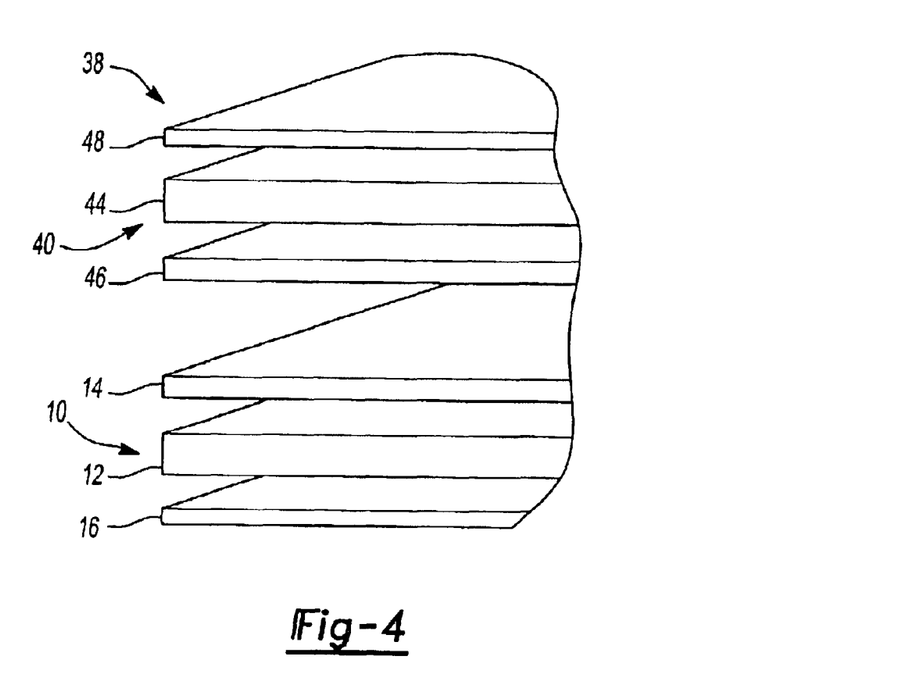
FIG. 4 is an exploded view of an energy management system in accordance with the invention.

Turning to FIG. 4, an exploded view of an embodiment of the invention in which an energy management structure 38 having a polyurethane crash pad 40 bonded to a headliner 10 is shown. The substrate 42 is illustratively fiber reinforced headliner material of the type described above. Elements in FIG. 4 corresponding to elements in FIG. 3 are identified with like reference numerals. Crash pad 40 is illustratively made of a layer of polyurethane foam 44 with a backing layer of polyester fleece or polypropylene 46 adhered to the layer of polyurethane foam 44 in known fashion, such as with adhesive or adhesive tape. Crash pad 40 may optionally also have a facing layer 48, which can be felt, polyester fleece, or the like.

Headliner 10 is placed in vibration welding apparatus 20 (FIG. 3) in the manner described above and crash pad or pads 40 placed on crash pad fixtures 34 (FIG. 3) with polyester backing layer 44 facing toward headliner 10. Headliner 10 and crash pad(s) 40 are then vibration welded together in the manner described above.

Table 3 shows welding parameters for structures made by welding on a Branson Ultrasonics MINI-VIBRATION WELDER pieces of typical polyester backed headliner material to a layer of polyurethane foam having a polypropylene fleece backing layer as described above. In the welds of Table 3, the thermoplastic material from the polypropylene fleece backing layer of the crash pad penetrates the polyester backing layer 14 of headliner 10 forming a mechanical bond. In each case, a bond was achieved. The optimum weld parameters would illustratively be determined heuristically. (Polyurethane parts with polypropylene fleece backing approx. 10 mm thick and 60 mm×15 mm)

TABLE 3

| Part No. | Frequency [Hz] | Amplitude [mm] | Weld Force [N] | Time/ Melt [sec] | Hold Force [N] | Hold Time [sec] |
|---|---|---|---|---|---|---|
| 1 | 240 | 1.70 | 340 | 6 sec. | 340 | 3 |
| 2 | 240 | 1.70 | 340 | 6 sec. | 340 | 3 |
| 3 | 240 | 1.70 | 340 | 8 sec. | 340 | 3 |
| 4 | 240 | 1.70 | 340 | 8 sec. | 340 | 3 |
| 5 | 240 | 1.70 | 340 | 8 sec. | 340 | 3 |

In some cases, two parts are made from similar material having thermoplastic but not enough to permit effective vibration or friction welding. For example, it is difficult to effectively vibration or friction weld two pieces of the above described headliner material together even though their polyester backing layers are a thermoplastic. In such cases, an intermediate thermoplastic material that can be vibration or friction welded to the two parts is interposed between the two polyester backing layers. The intermediate thermoplastic material can be adhered to one of the parts such as by adhesive or vibration or friction welded to the part. The other part is then vibration or friction welded to the first part, and particularly to the thermoplastic layer adhered to the first part.

Figure 5:
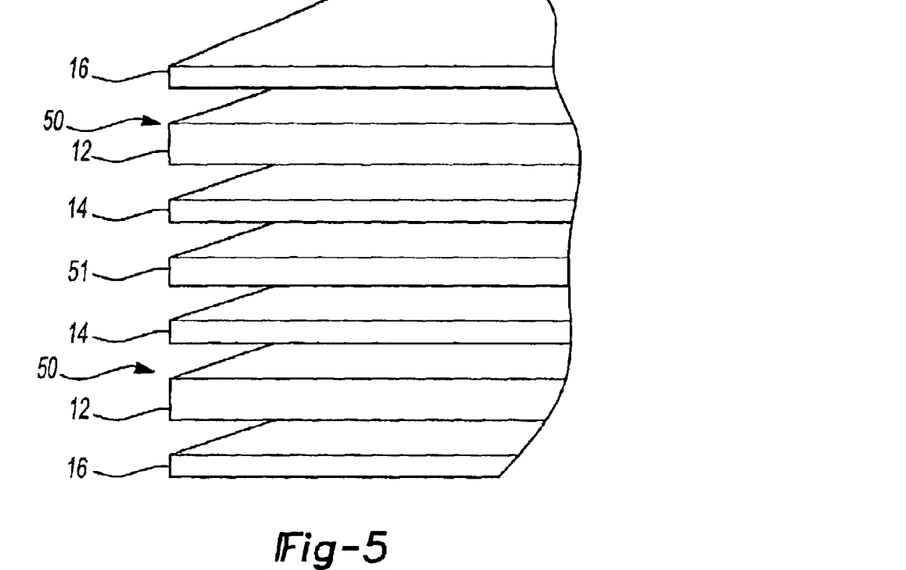
FIG. 5 is an exploded view of an energy management system in accordance with another embodiment of the invention.

An example where the above described process can be used is to vibration or friction weld two pieces of the above described typical headliner material together. As discussed above, a headliner 50 made of this typical headliner material includes a polyurethane foam layer 12 having a polyester backing sheet 14 and a front sheet 16 of fabric such as felt. Although polyester is a thermoplastic, two layers of polyester typically cannot be effectively friction welded. FIG. 5 is an exploded view of two pieces 50 of such headliner material vibration or friction welded by interposing a layer polypropylene film 51 between the polyester backing layers 14 of the two pieces of headliner 50. Polypropylene film 51 is bonded to the polyester backing layer 14 of one of the pieces 50 such as by adhesive, adhesive tape, or the like, or by vibration or friction welding. The resulting headliner piece 50 with polypropylene film 51 bonded to its polyester backing layer 14 is then vibration or friction welded to the other piece 50, with the polypropylene film 51 being vibration or friction welded to the polyester backing layer 14 of the other piece 50.

Table 4 shows illustrative welding parameters for a number of welds where two such pieces 50 were vibration or friction welded together in such a manner with a Branson Ultrasonics MINI-VIBRATION WELDER. (Parts approximately 50 mm×50 mm)

TABLE 4

| Part No. | Frequency [Hz] | Amplitude [mm] | Weld Force [N] | Time/ Melt [sec] | Hold Force [N] | Hold Time [sec] |
| --- | --- | --- | --- | --- | --- | --- |
| 1 | 240 | 1.70 | 340 | 8 | 340 | 3 |
| 2 | 240 | 1.70 | 340 | 8 | 340 | 3 |
| 3 | 240 | 1.70 | 340 | 4 | 340 | 3 |
| 4 | 240 | 1.70 | 340 | 5 | 340 | 3 |
| 5 | 240 | 1.70 | 340 | 1 | 340 | 3 |

Figure 8:
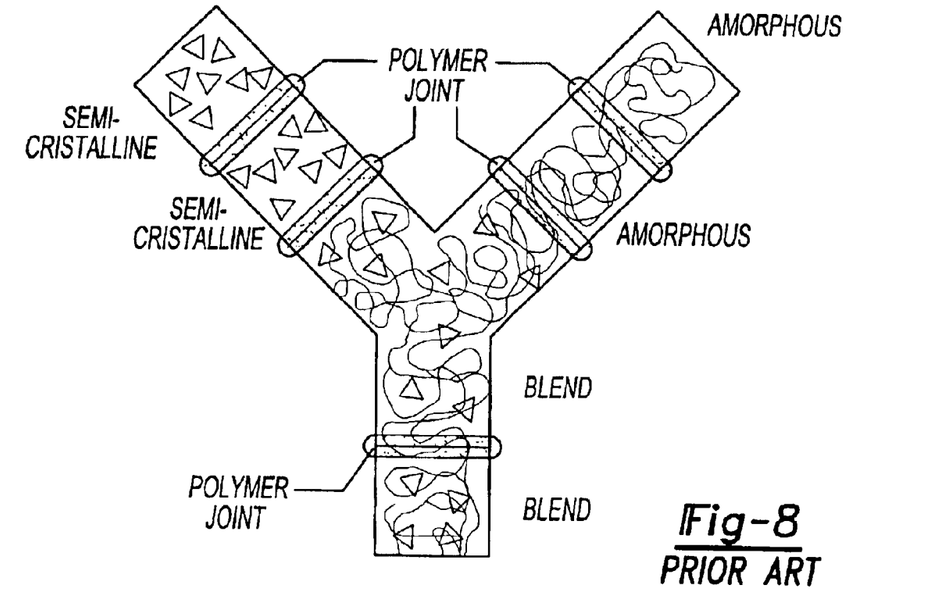
FIG. 8 is a graphical illustration of a polymer joint formed by vibration welding.

FIG. 8 shows a molecular polymer bond between two parts made of polymers where the polymers adhere to each other. As is known, in a molecular polymer bond, the polymers of the two parts mix and become one polymer. Thus, as is know, to melt two polymers together to form a polymer bond, the two polymers, if not the same polymers, must have comparable melt temperatures and melt flow indices.

Figure 9:
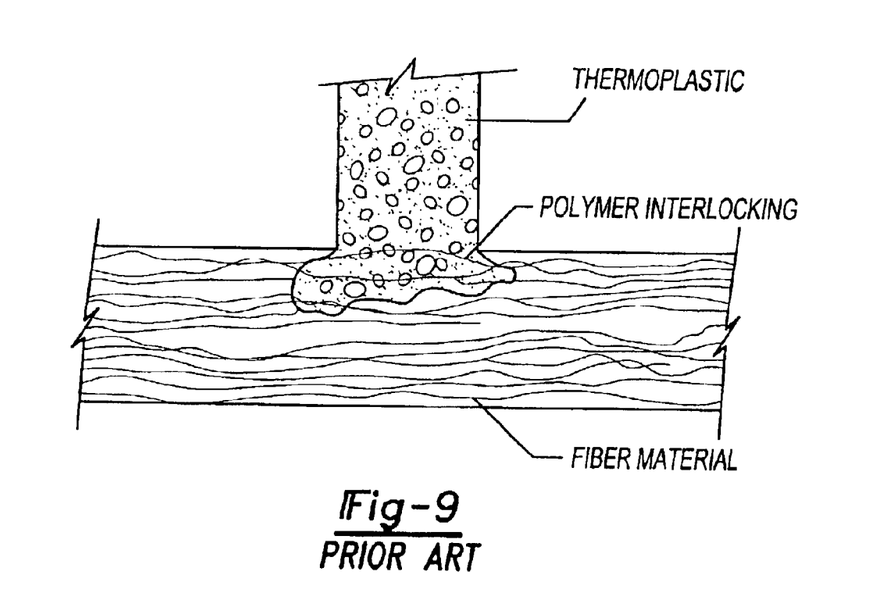
FIG. 9 is a graphical illustration of a mechanical joint formed by vibration welding.

FIG. 9 shows a mechanical or interlocking bond formed by melting the polymers of two parts together. In a mechanical bond, the polymers of one part, such as thermoplastic part melt and interlock around elements in the polymer of the other part, such as fiber material. However, in a pure mechanical bond, the polymers of the two parts do not intermix as described above with reference to the molecular polymer bond of FIG. 8.

Table 5 shows welding parameters for a Branson Ultrasonic Vibration Welder Type VW4 used to weld a honeycomb material (Type "WAVE CORE" with fleece backing on both sides from Trauma Lite) to headliner material with a polypropylene backing (Type "AZDEL" from the Lear Corporation). Parts are welded together with a strip therebetween for pull-tests. (Honeycomb material Type "WAVE CORE", 15 mm thick with fleece backing, part size 70×120 mm. Headliner material Type "AZDEL" with polypropylene backing, part size 200×150 mm.)

TABLE 5

| Part No. | Frequency [Hz] | Amplitude [mm] | Weld Force [N] | Time/ Melt [sec] | Hold Force [N] | Time/ Hold [sec] | Melt Down [mm] | Comments |
| --- | --- | --- | --- | --- | --- | --- | --- | --- |
| 1 | 240 | 1.75 | 1134 | 3 | 1134 | 5 | 0.092–0.11 | Moving: honeycomb Holding: headliner |
| 2 | 240 | 1.75 | 1588 | 5 | 1588 | 5 | 0.070–0.080 | Moving: headliner Holding: honeycomb |
| 3 | 240 | 1.75 | 907 | 5 | 907 | 5 | 0.020 | Moving: headliner Holding: honeycomb |
| 4 | 240 | 1.75 | 907 | 5 | 907 | 5 | 0.030–0.050 | Moving: honeycomb Holding: headliner |
| 5 | 240 | 1.75 | 907 | 4 | 907 | 4 | 0.011–0.013 | Moving: headliner Holding: honeycomb |
| 6 | 240 | 1.75 | 907 | 4 | 907 | 4 | 0.015–0.016 | Moving: honeycomb Holding: headliner |
| 7 | 240 | 1.75 | 680 | 4 | 680 | 4 | 0.002–0.003 | Moving: headliner Holding: honeycomb |
| 8 | 240 | 1.75 | 680 | 4 | 680 | 4 | 0.006–0.008 | Moving: honeycomb Holding: headliner |
| 9 | 240 | 1.75 | 1360 | 3 | 1360 | 3 | 0.011 | Moving: headliner Holding: honeycomb |
| 10 | 240 | 1.75 | 1360 | 3 | 1360 | 3 | 0.013–0.014 | Moving: honeycomb Holding: headliner |

Table 6 shows welding parameters for a Branson Ultrasonic Vibration Welder Type VW4 used to weld a polypropylene safety-plastic (from the Oakwood Group) to headliner material with a polypropylene backing (Type "AZDEL" from the Lear Corporation) and headliner material with a polyester backing (from the Lear Corporation). (Safety Plastic, part size 100×140 mm. Headliner material with polypropylene/polyester-backing, part size 120×160 mm.)

TABLE 6

| Part No. | Frequency [Hz] | Amplitude [mm] | Weld Force [N] | Time/ Melt [sec] | Hold Force [N] | Time/ Hold [sec] | Comments |
|---|---|---|---|---|---|---|---|
| 1 | 240 | 1.75 | 1134 | 3 | 1134 | 5 | Moving: safety plastic Holding: headliner with PP backing |
| 2 | 240 | 1.75 | 1134 | 3 | 1134 | 5 | Moving: safety plastic Holding: headliner with PP backing |
| 3 | 240 | 1.75 | 1134 | 3 | 1134 | 5 | Moving: safety plastic Holding: headliner with PE backing |
| 4 | 240 | 1.75 | 1134 | 3 | 1134 | 5 | Moving: safety plastic Holding: headliner with PE backing |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An energy management system comprising a substrate and at least one crash pad vibration welded together.

2. An energy management system comprising a substrate made at least in part of thermoplastic material, at least one crash pad made at least in part of thermoplastic material, the substrate and the crash pad vibration welded together.

3. The energy management system of claim 2 wherein the crash pad includes at least one of a foam crash pad, honeycomb structure crash pad and rib structure.

4. The energy management system of claim 2 wherein the crash pad includes one of a polypropylene honeycomb structure.

5. An energy management system comprising a substrate made at least in part of thermoplastic material and a crash pad, the crash pad including a base layer of thermoset material having a backing layer of thermoplastic material, the crash pad and the substrate vibration welded together by vibration welding the crash pad and substrate so that the substrate and the backing layer of the crash pad are vibration welded together.

6. An energy management system comprising a substrate made at least in part of thermoplastic material and a crash pad, the crash pad including a base layer of polyurethane foam having a backing layer of polypropylene fleece, the crash pad and the substrate vibration welded together by vibration welding the crash pad and substrate so that the substrate and the polypropylene fleece backing layer of the crash pad are vibration welded together.

7. An energy management system comprising a substrate made at least in part of thermoplastic material, at least one crash pad having a base layer and a backing layer made at least in part of thermoplastic material, the crash pad and the substrate vibration welded together by vibration welding the crash pad and substrate so that the substrate and the backing layer of the crash pad are vibration welded together.

8. The energy management system of claim 7 wherein the base layer of the crash pad is made of a material that is incompatible with being vibration welded to the substrate.

9. The energy management system of claim 7 wherein the base layer of the crash pad is made of a thermoset material.

10. The energy management system of claim 7 wherein the base layer of the crash pad is made of polyurethane foam.

11. An energy management system comprising a substrate having a backing layer made at least in part of thermoplastic material, at least one crash pad made at least in part of thermoplastic material, the crash pad and substrate vibration welded together by vibration welding the crash pad and substrate so that the crash pad and the backing layer of the substrate are vibration welded together.

12. The energy management system of claim 11 wherein the substrate comprises a headliner having a base layer with the backing layer on the base layer, the backing layer comprising a layer of polyester, the crash pad and substrate vibration welded together by vibration welding the crash pad and substrate so that the crash pad and the polyester backing layer of the substrate are vibration welded together.

13. The energy management system of claim 12 wherein the crash pad comprises a honeycomb structure.

14. The energy management system of claim 12 wherein the crash pad comprises a polypropylene honeycomb structure.

15. The energy management system of claim 12 wherein the crash pad includes a base layer of thermoset material having a backing layer of thermoplastic material, the crash pad and the substrate vibration welded together by vibration welding the crash pad and substrate so that the backing layer of the crash pad and the polyester backing layer are vibration welded together.

16. A headliner energy management system, comprising a headliner having a base layer and a polyester backing layer, a polypropylene honeycomb crash pad, the headliner and crash pad vibration welded together by vibration welding the headliner and crash pad so that the crash pad and the polyester backing layer of the headliner are vibration welded together.

17. A headliner energy management system, comprising a headliner having a base layer and a polyester backing layer, a crash pad having a base layer and a backing layer made at least in part of thermoplastic material, the headliner and crash pad vibration welded together by vibration welding the headliner and crash pad so that the polyester backing layer of the headliner and the backing layer of the crash pad are vibration welded together.

18. A structure, comprising a polypropylene honeycomb structure vibration welded on opposed sides to polypropylene plates.

19. A method of vibration welding first and second parts comprising the steps of prior to vibration welding the first and second parts adhering to a surface of at least the first part a layer of material made at least in part of thermoplastic that is compatible for being vibration welded to the second part and vibration welding the first and second parts together by vibration welding the first and second parts so that the layer of material on the first part is vibration welded to the second part.

20. The method of claim 19 wherein the second part is made, at least in part, of a thermoplastic material that is compatible for being vibration welded to the thermoplastic material of the layer of material on the surface of the first part.

21. The method of claim 20 wherein the thermoplastic material of the second part and the thermoplastic material of the layer of material on the surface of the first part have comparable melt temperatures and flow indices.

22. A method of vibration welding first and second parts comprising the steps of prior to vibration welding the first and second parts adhering to a surface of each of the first and second parts respective layers of material that are compatible with being vibration welded to each other, and vibration welding the first and second parts together by vibration welding the first and second parts so that the layer of material adhered to the surface of the first part is vibration welded to the layer of material adhered to the second part.

23. The method of claim 22 wherein the layers of materials on the surfaces of the first and second part are each made at least in part of thermoplastic material, the thermoplastic material of the layer of material adhered to the surface of the first part being compatible with being vibration welded to the thermoplastic material of the layer of material adhered to the surface of the second part.

24. The method of claim 23 wherein the thermoplastic material of the layer of material adhered to the surface of the second part and the thermoplastic material of the layer of material adhered to the surface of the first part have comparable melt temperatures and flow indices.

25. A method of vibration welding first and second parts made of materials that are incompatible for being vibration welded together, comprising the steps of prior to vibration welding the two parts together adhering to a surface of at least the first part a layer of material made at least in part of material that is compatible for being vibration welded to the second part, vibration welding the first and second parts so that the second part and the layer of material on the surface of the first part are vibration welded together.

26. The method of claim 25, wherein the second part is made at least in part of thermoplastic, the layer of material adhered to the surface of the first part is made at least in part of a thermoplastic that is compatible with being vibration welded to the thermoplastic material of the second part.

27. The method of claim 26, wherein the layer of material adhered to the surface of the first part is polypropylene film.

28. A method of vibration welding first and second parts made of materials that are incompatible for being vibration welded together, the second part made at least in part of thermoplastic material, comprising the steps of prior to vibration welding the first and second parts together adhering to a surface of the first part a layer of material made at least in part of thermoplastic that is compatible for being vibration welded to the thermoplastic material of the second part, vibration welding the first and second parts so that the second part and the layer of material on the surface of the first part are vibration welded together.

29. The method of claim 28 wherein the layer of material adhered to the surface of the first part is polypropylene film.

30. A method of vibration welding first and second parts made of materials that are incompatible for being vibration welded together, the steps of prior to vibration welding the first and second parts together adhering to a surface of the first part and to a surface of the second part respective layers of material that are compatible for being vibration welded to each other, and vibration welding the first and second parts so that the respective layers of materials on the respective surfaces of the first and second parts are vibration welded together.

31. The method of claim 30 wherein the respective layers of materials are made at least in part of thermoplastic material.

32. The method of claim 30 wherein the respective layers of materials are polypropylene film.

* * * * *